(12) United States Patent
Tiirola et al.

(10) Patent No.: US 10,757,558 B2
(45) Date of Patent: *Aug. 25, 2020

(54) DISCOVERY IN A COMMUNICATION SYSTEM

(71) Applicant: Nokia Solutions and Networks Oy, Espoo (FI)

(72) Inventors: Esa Tapani Tiirola, Kempele (FI); Bernhard Raaf, Neuried (DE)

(73) Assignee: HMD Global Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,057

(22) Filed: Dec. 21, 2017

(65) Prior Publication Data

US 2018/0376315 A1    Dec. 27, 2018

Related U.S. Application Data

(63) Continuation of application No. 14/761,739, filed as application No. PCT/EP2013/050940 on Jan. 18, 2013, now Pat. No. 9,877,180.

(51) Int. Cl.
*H04W 8/00*     (2009.01)
*H04W 72/04*    (2009.01)
*H04W 40/24*    (2009.01)
*H04W 76/14*    (2018.01)

(52) U.S. Cl.
CPC ......... *H04W 8/005* (2013.01); *H04W 72/048* (2013.01); *H04W 40/24* (2013.01); *H04W 76/14* (2018.02)

(58) Field of Classification Search
CPC ... H04W 8/005; H04W 72/048; H04W 76/14; H04W 40/24
See application file for complete search history.

(56) References Cited

U.S. PATENT DOCUMENTS 8,238,313 B2 * 8/2012 Maltsev .............. H04W 72/082
                                                              370/337
2009/0323647 A1 * 12/2009 Park ..................... H04W 8/005
                                                              370/338

(Continued)

FOREIGN PATENT DOCUMENTS

CN    101741452 A    6/2010
CN    101790852 A    7/2010

(Continued)

OTHER PUBLICATIONS

3GPP TR 22.803 V12.0.0 (Dec. 2012), "3rd Generation Partnership Project; Technical Specification Group Services and System Aspects, Feasibility study for Proximity Services (ProSe) (Release 12)", 40 pgs.

*Primary Examiner* — Brian D Nguyen
(74) *Attorney, Agent, or Firm* — Harrington & Smith (57) ABSTRACT

Discovery of devices in a network of devices comprises assigning resources for the discovery, and providing accordingly at least two discovery patterns of transmission and reception phases for the devices in the network for communication of information between the devices. A device can transmit or receive information in accordance with a dedicated discovery pattern of transmission and reception phases allocated from a set of different discovery patterns.

21 Claims, 8 Drawing Sheets

(56) References Cited

U.S. PATENT DOCUMENTS

| | | | | |
|---|---|---|---|---|
| 2010/0110999 A1* | 5/2010 | Li | ............... | H04W 52/242 |
| | | | | 370/329 |
| 2012/0201208 A1* | 8/2012 | Kang | ............... | H04W 16/14 |
| | | | | 370/329 |
| 2012/0250531 A1* | 10/2012 | Patil | ............... | H04W 8/005 |
| | | | | 370/252 |
| 2013/0066966 A1* | 3/2013 | Patil | ............... | H04W 8/005 |
| | | | | 709/204 |
| 2015/0223257 A1* | 8/2015 | Wilhelmsson | ...... | H04W 72/082 |
| | | | | 455/452.1 |

FOREIGN PATENT DOCUMENTS

| | | | |
|---|---|---|---|
| CN | 102318421 | A | 1/2012 |
| JP | 2012/512550 | A | 5/2012 |
| JP | 2012/517784 | A | 8/2012 |
| JP | 2012/231475 | A | 11/2012 |
| WO | 2009/009355 | A2 | 1/2009 |
| WO | WO-2009/009355 | A2 | 1/2009 |
| WO | 2010/093874 | A1 | 8/2010 |
| WO | WO-2010/093874 | A1 | 8/2010 |
| WO | 2012/172476 | A1 | 12/2012 |
| WO | 2012170794 | A1 | 12/2012 |
| WO | WO-2013/006648 | A1 | 1/2013 |
| WO | WO-2013/009992 | A2 | 1/2013 |
| WO | 2014/056517 | A1 | 4/2014 |

\* cited by examiner

| N | 2 | | | | | | | |
|---|---|---|---|---|---|---|---|---|
| k | 0 | 1 | 2 | | | | | |
| # OF PATTERNS | 1 | 2 | 1 | | | | | |
| Σ | 4 | | | | | | | |
| N | 3 | | | | | | | |
| k | 0 | 1 | 2 | 3 | | | | |
| # OF PATTERNS | 1 | 3 | 3 | 1 | | | | |
| Σ | 8 | | | | | | | |
| N | 4 | | | | | | | |
| k | 0 | 1 | 2 | 3 | 4 | | | |
| # OF PATTERNS | 1 | 4 | 6 | 4 | 1 | | | |
| Σ | 16 | | | | | | | |
| N | 5 | | | | | | | |
| k | 0 | 1 | 2 | 3 | 4 | 5 | | |
| # OF PATTERNS | 1 | 5 | 10 | 10 | 5 | 1 | | |
| Σ | 32 | | | | | | | |
| N | 6 | | | | | | | |
| k | 0 | 1 | 2 | 3 | 4 | 5 | 6 | |
| # OF PATTERNS | 1 | 6 | 15 | 20 | 15 | 6 | 1 | |
| Σ | 64 | | | | | | | |
| N | 7 | | | | | | | |
| k | 0 | 1 | 2 | 3 | 4 | 5 | 6 | 7 |
| # OF PATTERNS | 1 | 7 | 21 | 35 | 35 | 21 | 7 | 1 |
| Σ | 128 | | | | | | | |
| N | 8 | | | | | | | | |
| k | 0 | 1 | 2 | 3 | 4 | 5 | 6 | 7 | 8 |
| # OF PATTERNS | 1 | 8 | 28 | 56 | 70 | 56 | 28 | 8 | 1 |
| Σ | 256 | | | | | | | | |

DISCOVERY IN A COMMUNICATION SYSTEM

CROSS REFERENCE TO RELATED APPLICATIONS

This application is a Continuation Application of U.S. patent application Ser. No. 14/761,739 filed on Jul. 17, 2015, now U.S. Pat. No. 9,877,180 which is the national phase entry of International (PCT) Patent Application Serial No. PCT/EP2013/050940, filed Jan. 18, 2013, published under PCT Article 21(2) in English, the disclosure of which is incorporated by reference herein in its entirety.

This disclosure relates to device discovery in a communication system.

A communication system can be seen as a facility that enables communications between two or more nodes or devices such as fixed or mobile communication devices, access points (AP) such as base stations, relays, servers and so on. A communication system and compatible communicating entities typically operate in accordance with a given standard or specification which sets out what the various entities associated with the system are permitted to do and how that should be achieved. For example, the standards, specifications and related protocols can define the manner how various devices shall communicate with each other, how various aspects of the communications shall be implemented and how the devices shall be configured.

Signals can be carried on wired or wireless carriers. Examples of wireless communication systems include architectures that are standardized by the 3rd Generation Partnership Project (3GPP). A recent development in this field is often referred to as the long-term evolution (LTE) of the Universal Mobile Telecommunications System (UMTS) radio-access technology. Further developments of the communication systems are expected.

A communication device can be provided with an appropriate signal receiving and transmitting arrangement for enabling communications with other devices. Typically a communication device is used for enabling receiving and transmission of communications such as speech and data. A user can access wirelessly a communication system by means of an appropriate wireless communication device or terminal, often referred to as user equipment (UE). Other types of wireless communication devices are also known, for example various access points, relays, and so on that are capable of communicating wirelessly with other devices.

New services and communication architectures are emerging. For example, proximity-based applications and services have been proposed. The introduction of a proximity services (ProSe) capability in systems such as LTE can be used to enable use of the proximity-based applications. Another example of users of proximity services are various public safety organisations.

Figure 1:
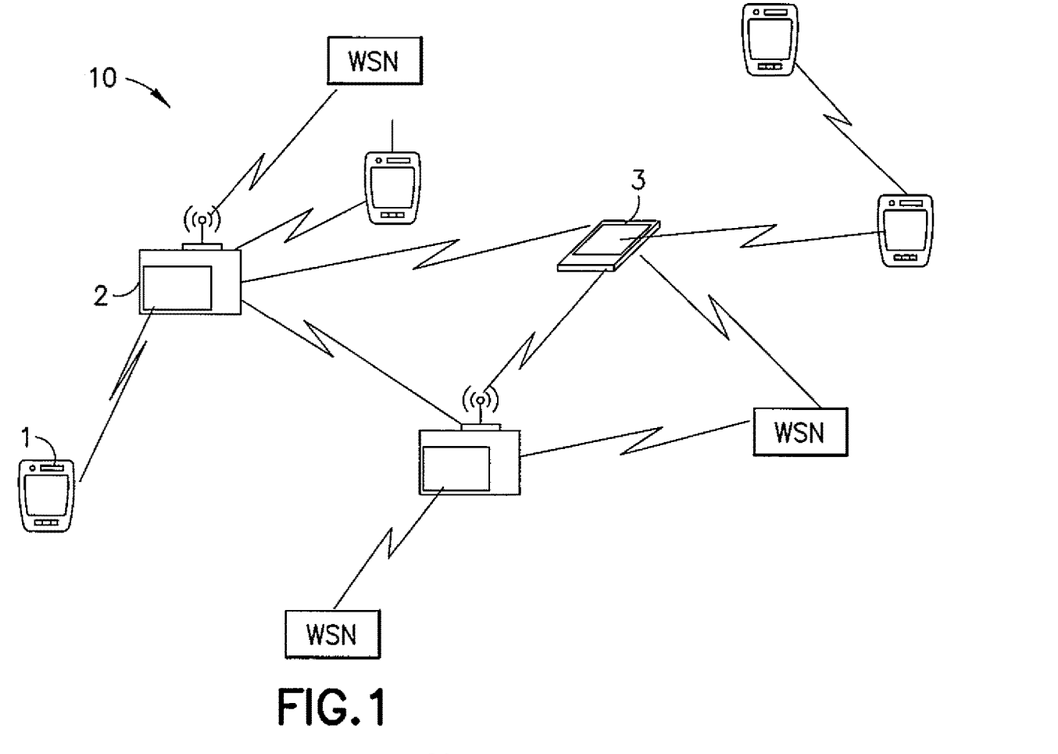
FIG. 1 shows a schematic diagram of a system where certain embodiments can be implemented.

One aspect of proximity services is the need for devices capable of device-to-device communications (D2D) to be able to discover each other. This should preferably be provided in a power-efficient manner. The issue of discovery relates not only to D2D communications, but a more generic scenario with a tree type network topology involving, in addition to traditional access point to a user equipment (AP2UE) links both direct D2D and access point to access point (AP2AP) links as well. An example of a possible topology for such system is shown in FIG. 1.

Telecommunication systems may thus need to support a discovery function, enabling network nodes to discover each other directly. Prior art techniques only allow for a limited number of nodes/communication links. However, a more generic arrangement accommodating an arbitrary number of devices and various communication needs among plurality of network nodes might be desired.

It is noted that the above discussed issues are not limited to any particular communication environment and station apparatus but may occur in any appropriate system.

Embodiments of the invention aim to address one or several of the above issues.

In accordance with an embodiment there is provided a method for controlling discovery of devices in a network of devices, comprising assigning resources for the discovery, and providing accordingly at least two discovery patterns of transmission and reception phases for the devices in the network for communication of information between the devices.

In accordance with an embodiment there is provided a method for discovery of devices by a device in a network of devices, comprising transmitting or receiving information in accordance with a dedicated discovery pattern of transmission and reception phases allocated from a set of different discovery patterns.

In accordance with an embodiment there is provided an apparatus for controlling discovery of devices in a network of devices, the apparatus comprising at least one processor, and at least one memory including computer program code, wherein the at least one memory and the computer program code are configured, with the at least one processor, to assign resources for the discovery, and provide accordingly at least two discovery patterns of transmission and reception phases for the devices in the network for communication of information between the devices.

In accordance with an embodiment there is provided an apparatus for a device of a network of devices, the apparatus comprising at least one processor, and at least one memory including computer program code, wherein the at least one memory and the computer program code are configured, with the at least one processor, to transmit and/or receive information in accordance with a dedicated discovery pattern of transmission and reception phases allocated from a set of different discovery patterns.

In accordance with more detailed embodiments control of transmission and/or reception phases of information is based on grouping of discovery patterns. Patterns in a first group may enable bi-directional communication of information between devices associated with the first group. Patterns in a second group may enable mono-directional communication of information between devices associated with the second group and devices associated with said first group.

Each pattern may have N portions for transmission and reception phases and the patterns are grouped based on the number k of portions of the pattern that are allocated for the transmission phases, wherein devices associated with a group having a smaller value of k are enabled to receive information from devices associated with a group having a higher value of k.

A hierarchy may be provided between different devices in the network by means of the grouping.

Cell specific discovery control may be provided based on a pattern of transmission and reception phases allocated for a device comprising an access point involved in the discovery in accordance with a normal control type. The access point can apply a specific discovery format and dedicated discovery patterns for other devices involved in the discovery.

Data resources of subframes may be used for the discovery patterns.

For devices arranged in at least two different trees, different discovery patterns may be provided for neighbouring devices by inverting polarity of discovery patterns associated with devices of at least one of the trees. The order of discovery patterns may be swapped between neighbouring devices.

Two sets of discovery patterns may be used, wherein a first set of patterns is for higher level coordination of operation between the devices and a second set of patterns is for implementing parts of the higher level coordination commands.

A computer program comprising program code means adapted to perform the herein described methods may also be provided. In accordance with further embodiments apparatus and/or computer program product that can be embodied on a computer readable medium for providing at least one of the above methods is provided.

A device such as a base station, a relay or user equipment can be configured to operate in accordance with the various embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, access systems thereof, and communication devices are briefly explained with reference to FIGS. 1 and 2 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). Other examples of radio access system include those provided by base stations of systems that are based on technologies such as wireless local area network (WLAN) and/or WiMax (Worldwide Interoperability for Microwave Access).

In system 10 communication devices 1 can be provided wireless access to a wider communication system via access points 2, for example base stations or similar wireless transmitter and/or receiver nodes providing wireless access for users. FIG. 1 also shows devices 3 that act as relay nodes between the access points 2 and user devices 1. The communication devices may comprise any suitable device capable of wireless communication of data. Communication devices are typically controlled by at least one appropriate controller apparatus so as to enable operation thereof. The control apparatus can typically be provided with memory capacity and at least one data processor. The control apparatus and functions may be distributed between a plurality of control units.

Figure 2:
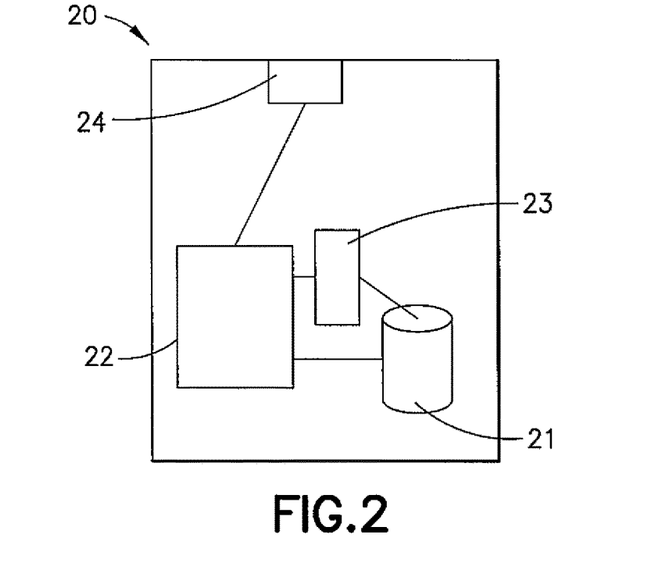
FIG. 2 shows a schematic diagram of a control apparatus according to some embodiments.

FIG. 2 shows an example of a control apparatus for a communication device, for example to be integrated with, coupled to and/or otherwise for controlling any of access point or other devices of FIG. 1. The control apparatus 20 can be configured to provide control functions in association with communication in general, and at least the service discovery aspect in accordance with certain embodiments described below. For this purpose the control apparatus comprises at least one memory 21, at least one data processing unit 22, 23 and an input/output interface 24. Via the interface the control apparatus can be coupled to a receiver and a transmitter of the device. The control apparatus can be configured to execute an appropriate software code to provide the control functions.

In the following examples the different nodes forming the network 10 of FIG. 1 can discover each other directly over the air. Examples describe use of specific discovery patterns and groups of discovery patterns applicable to nodes operating in a frame based system. In addition to discovery in traditional access point-to-user equipment (AP2UE) links, support is provided also for other link types, such as device-to-device (D2D) communication and wireless backhauling. Time division duplexing (TDD) is considered as a feasible solution for the service discovery for half duplex nodes. D2D and discovery may also use TDD technology in the case of FDD (Frequency Division Duplexing) devices. Scenarios where a node cannot transmit and receive at the same time on the spectrum of interest are assumed. Hence, the following examples concentrate on half-duplex technology.

The herein described patterns can be used for comprehensive bidirectional communication where all nodes are able to listen to each other. The proposed scheme can support network topologies containing network elements of different hierarchies which require mono-directional discovery function among network nodes, e.g. from higher towards lower hierarchy levels.

The discovery patterns can be built on top of a frame based communication arrangement. The network nodes can be assumed to be synchronized with each other.

Figure 3:
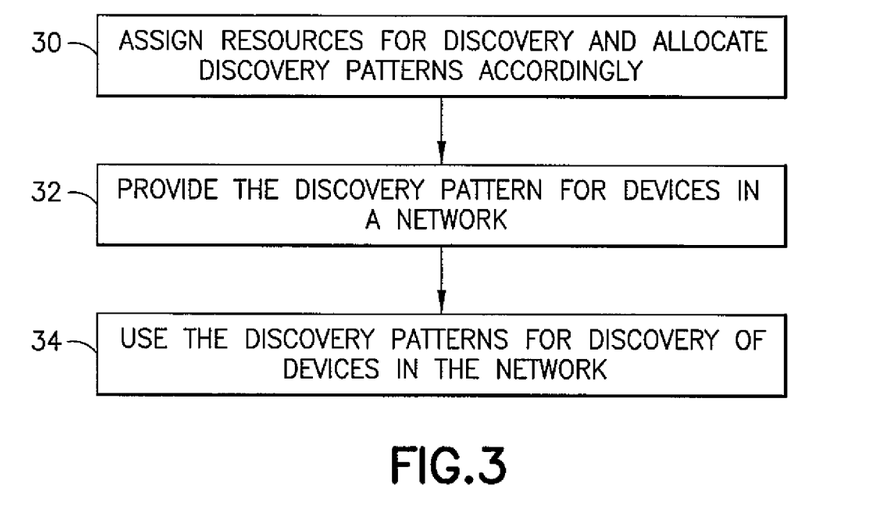
FIG. 3 shows a flowchart according to an embodiment.

The flowchart of FIG. 3 shows general principles of operation where specific discovery patterns or Tx/Rx patterns are employed to enable network nodes, or devices, configured to form e.g. a tree topology, to discover each other directly over the air. Discovery of devices in a network of devices can be controlled by providing different discovery patterns of transmission and reception phases for different devices in the network for transmission and reception of discovery information between the devices, see block 32. Prior to allocation of the discovery patterns discovery resources (e.g. frequency/time/code) are made available at 30.

A network entity that is responsible for allocating the discovery patterns can also control the reservation/assigning of those resources for the devices that are a part of the discovery. For example, for D2D an appropriate controlling network entity may comprise an eNB or another access point in control of allocation of discovery patterns. Generally speaking, the control can be logically provided by a network node on the highest hierarchy level in a certain geographical area.

The discovery patterns are delivered to relevant devices in the network at 32.

In accordance with a possibility discovery patterns are generated in advance and described in relevant specifications. An eNB/AP may manage the usage of the discovery patterns in accordance with the specifications. The delivery of available discovery pattern delivery can be based e.g. on tabulation in a relevant specification listing available discovery patterns. There may also be a predefined pattern index for each pattern.

The specification may also, define discovery patterns corresponding to at least one group, or in more general terms, grouping of the patterns.

The usage/management of the discovery patterns may be provided in a similar fashion to reference signal usage in LTE. One approach is to use dedicated e.g. higher layer signaling, e.g. radio resource control (RRC) or medium access control (MAC), to assign discovery pattern or index of pattern for a certain node in the network. Assignment of discovery patterns can also be automated and derived also from a predefined parameter (e.g. UE-ID) and predefined criteria (e.g. type of node). Allocation of discovery resources (frequency/time/code) can be a part of broadcasted system information or beaconing signalling. Alternatively, they can be conveyed to the UE using dedicated signalling.

At 34 the devices can use the patterns for discovery of other devices in the network. This can comprise transmitting or receiving information using predetermined discovery resources in accordance with the dedicated discovery pattern of transmission and reception phases allocated from a set of different discovery patterns.

Use of transmission and/or reception phases for the device discovery can be based on arranging the discovery patterns in different groups. Patterns in a first group can be used to enable bi-directional communication of information between relevant devices allocated to said first group and patterns in a second group can be used to enable mono-directional communication of information between relevant devices allocated to the second group and devices allocated to said first group. More detailed examples of the use of the grouping are given below.

The specific Tx/Rx patterns and groups of such patterns can be defined to allow for a desired communication arrangement to network nodes that are configured to form e.g. a mesh, D2D or a self-backhauling network using half-duplex TDD technology.

Figure 4:
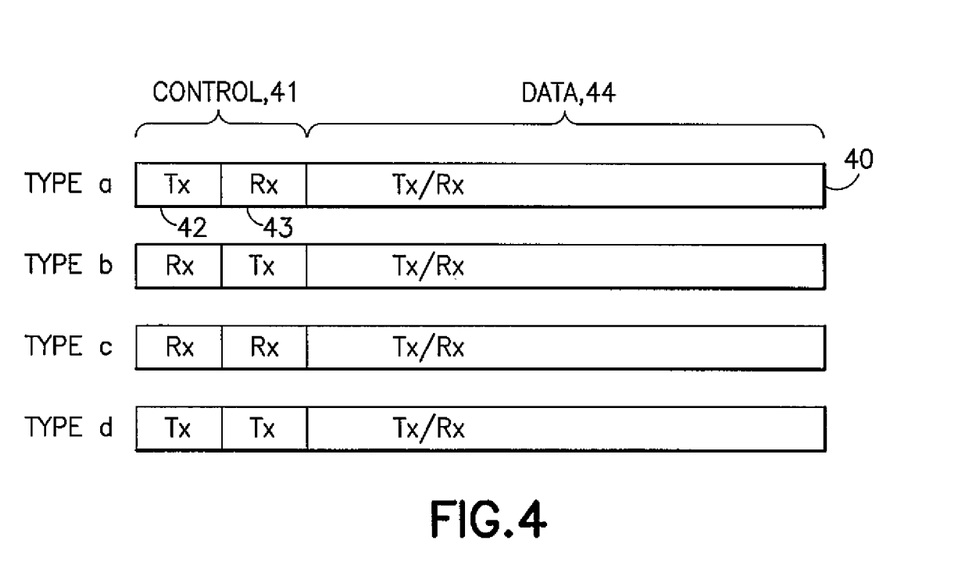
FIG. 4 shows different frame types.

An example for possible frame types for communications in the system of FIG. 1 is shown in FIG. 4. For simplicity, guard periods (GP) are not shown in the subframes of FIG. 4 between the different subframe portions. However, it can be assumed that GP is present when switching between transmission (Tx) and reception (Rx) phases, either way. Guard period allows flexible allocation of different control frame types for consecutive subframes.

In a traditional network topology, nodes can be divided between different types. In this example two types, A (access point; AP) and B (user equipment; UE), are considered. Conventionally communication is possible between A and B (A-B) but not for A-A (AP2AP) or B-B (UE2UE) whereas the latter is now enabled. The corresponding control frame types are shown in FIG. 4 as type a/b for A-B, and type c/d for A-A and B-B, respectively.

The data part 44 of the subframe 40 can be used either for transmission or reception. The two Tx/Rx portions 42, 43 are available in the control part 41 of each TDD subframe 40. In conventional arrangements this means that a single subframe does not allow mutual communications between more than two kinds of nodes. Having multiple frames grouped together allows more nodes in the system, as then there are more than two Tx/Rx portions to be used for the discovery patterns. These do not necessarily need to be consecutive but could be distributed in time over multiple subframes.

In accordance with an example the control frame types shown in FIG. 4 are varied over time in a coordinated and predefined manner to facilitate seamless control connection among all network nodes in a system. A framework how to design such patterns and how to allocate the patterns to different network nodes is also described.

Tx/Rx patterns within relevant groups can be defined based on pattern length. The pattern length is denoted in this presentation with N. Length N of a pattern means that there can be N portions available for transmission (Tx) and reception (Rx) phases. The patterns can be grouped into k+1 groups. Group k contains patterns with k Tx portions. As a pattern consists of N portions in total, the number of different patterns available for group k can be defined as:

$$\frac{N!}{k!(N-k)!} \tag{1}$$

The total number of available patterns, M, can be calculated as $$M = \Sigma_{k=0}^{N} \frac{N!}{k!(N-k)!} = 2^N \tag{2}$$

Different characteristics can be defined for the patterns. According to a feature all patterns within group k enable bi-directional communications of the nodes associated with that group with each other. This feature of discovery pattern design can be used to guarantee bi-directional communication among all patterns within one group. According to another characteristic feature, for k1<k2, all the patterns within group k1 enable reception of information from all patterns in group k2. That is, patterns in group k1 enable mono-directional communications with nodes controlled by patterns of group k2. The feature can be used to provide a hierarchical arrangement of the patterns of different groups. To illustrate the first feature further, consider two different discovery patterns P1 and P2. Both patterns have k Tx portions. Since the patterns are different, the Tx portions cannot completely overlap, and there is at least one Tx portion at some position of P2 for which the pattern P1 has an Rx portion. Therefore at that position the node using P1 can receive information that is transmitted by the node using P2. For reasons of symmetry, there is also at least one other position at which P1 has a Tx portion and P2 has an Rx portion. At that position the node using P2 can receive information that is transmitted by the node using P1.

To illustrate the second feature, consider two different discovery patterns P1 with k1 Tx portions and P2 with k2 Tx portions. Because k2>k1, P2 has more Tx portions, and consequently there is at least one Tx portion at some position of P2 for which the pattern P1 does not have a Tx portion but an Rx portion. Therefore at that position a node using P1 can receive information that is transmitted by a node using P2.

The discovery patterns and groups of discovery patterns may be defined by a relevant standard, or otherwise agreed beforehand. Some discovery patterns may be ruled out from the group of acceptable patterns according to a pre-defined criterion, e.g. a criterion related to latency involved in the discovery. This can be made e.g. by applying limitations on the number of consecutive Tx/Rx phases for acceptable discovery patterns. Thus, patterns with more than a pre-defined number of consecutive Tx or Rx indications can be ruled out from a set of acceptable discovery patterns.

Figure 5:
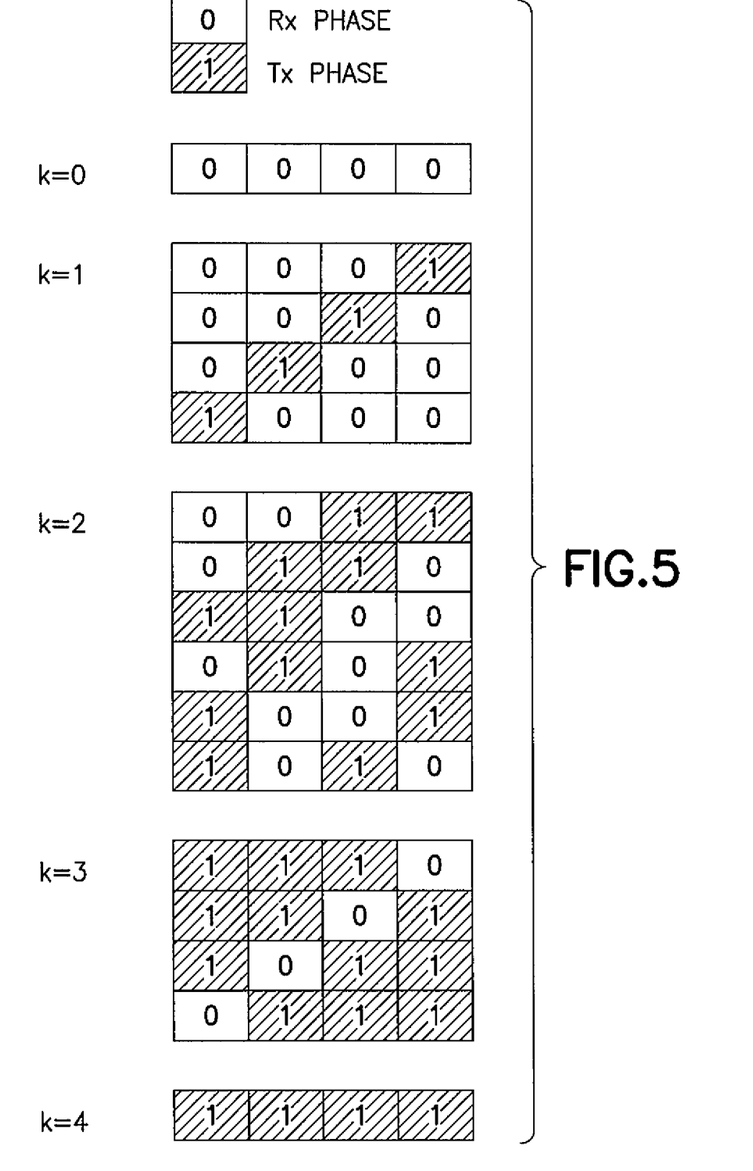
FIG. 5 shows an example of discovery patterns and grouping thereof.

An example of grouping of discovery patterns with length N=4 is shown in FIG. 5. In this Figure transmission (Tx) phases are denoted by "1" and reception (Rx) phases are denoted by "0". There are in total $2^4$=16 Tx/Rx patterns available. The patterns are grouped according to the number k of Tx phases. The number of patterns for different groups, calculated using equation (1), gives [1, 4, 6, 4, 1] patterns for group k, k∈[0, 1, 2, 3, 4].

It can be noted that all nodes which are part of the same group can communicate with each other as there are bi-directional communication links available for all the nodes using different patterns in the same group. It is noted that there can be only one node in groups k=0 and k=4.

The grouping provides k hierarchical groups of patterns. Bi-directional communication links can be provided among all the nodes of a group using the different patterns allocated for the group. Hierarchical discovery reception ("0"; first mono-directional link) between different groups is provided such that node(s) in group k=0 can hear all the patterns, nodes in group k=1 can hear all nodes of groups k=1-4, nodes in group k=2 can hear all nodes of groups k=2-4, and nodes in group k=3 can hear all nodes of groups k=3 and k=4.

Hierarchical discovery transmission ("1") corresponding to a second mono-directional link is provided such that all nodes can hear patterns of group k=4, nodes in groups k=0-3 can hear patterns of group k=3, nodes in groups k=0-2 can hear patterns of group k=2, and nodes in groups k=0 and k=1 can hear patterns of group k=1.

The grouping can be utilized in various ways. If full bi-directional communication is required, then all nodes need to be selected from the same group. This kind of approach is feasible, e.g. when arranging communication patterns for a predetermined, or an upper-limited, number of user equipment (UEs) configured to form a D2D communication network. Hierarchical arranged groups of discovery patterns can also be utilised to provide hierarchical control. For example, nodes at a higher hierarchy level may need to control nodes on a lower hierarchy level. This is feasible if the higher hierarchy nodes are allocated patterns from the same group or a higher group than the lower hierarchy nodes. To illustrate, for example access points, relays and terminals can be allocated to hierarchy groups in decreasing order.

The pattern length and the number of network nodes that can be configured to support bi-directional communication using the patterns are linked. That is, the number of supported nodes depends on the pattern length, which needs to be selected according to the maximum number of network nodes. On the other hand, the longer the pattern, the larger the latency involved in the discovery process. The following considers the issue of defining appropriate patterns lengths.

Figure 6:
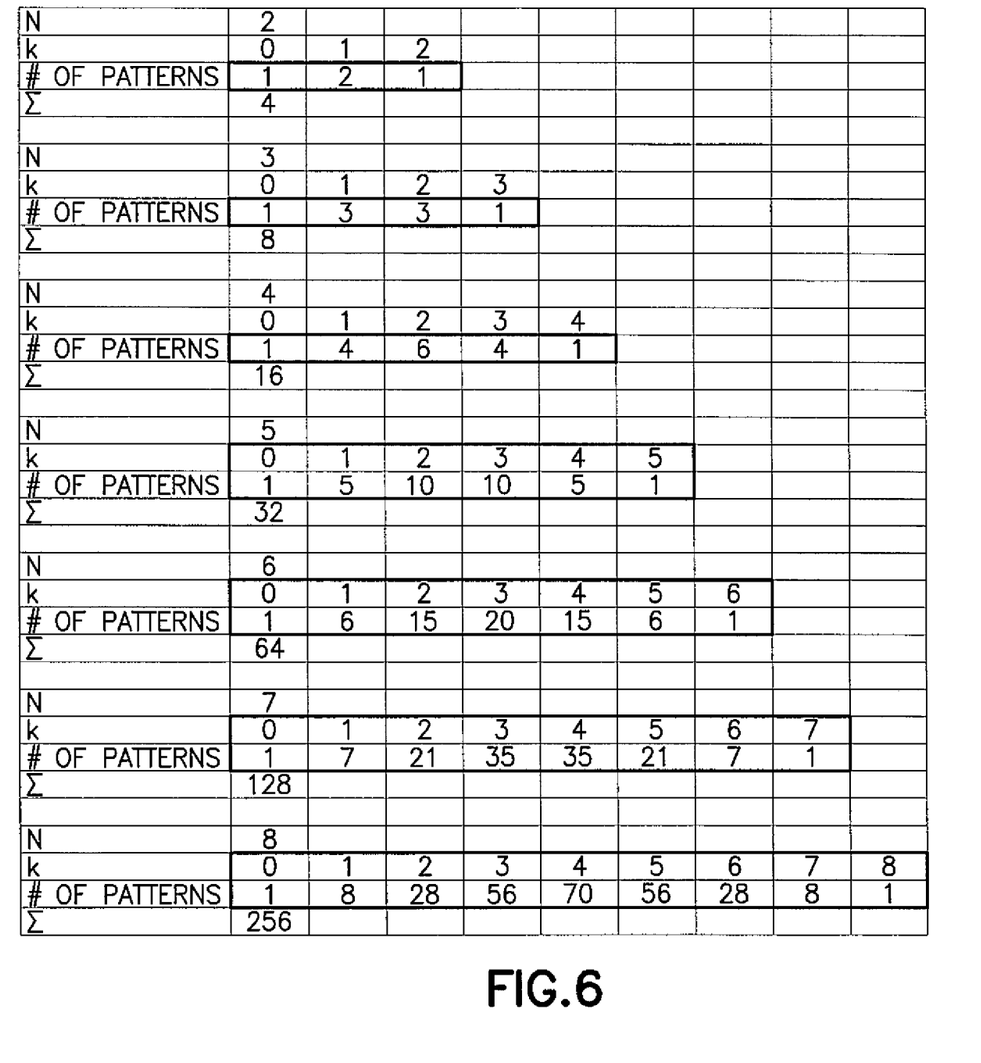
FIG. 6 shows number of discovery patterns for different patterns lengths.

FIG. 6 shows the number of available discovery patterns for different groups when N varies between 2 and 8. The number of patterns for each N value has been calculated using equation (1). It is readily appreciated the number of patterns shown in FIG. 5 (N=4) follows the calculation given in FIG. 6.

If full bi-directional communication is required, then discovery patterns for all nodes are selected from the same group. The group with the highest number of patterns for a given length N is the group where k=N/2. (For odd values of N, k can be rounded up or down).

Figure 7:
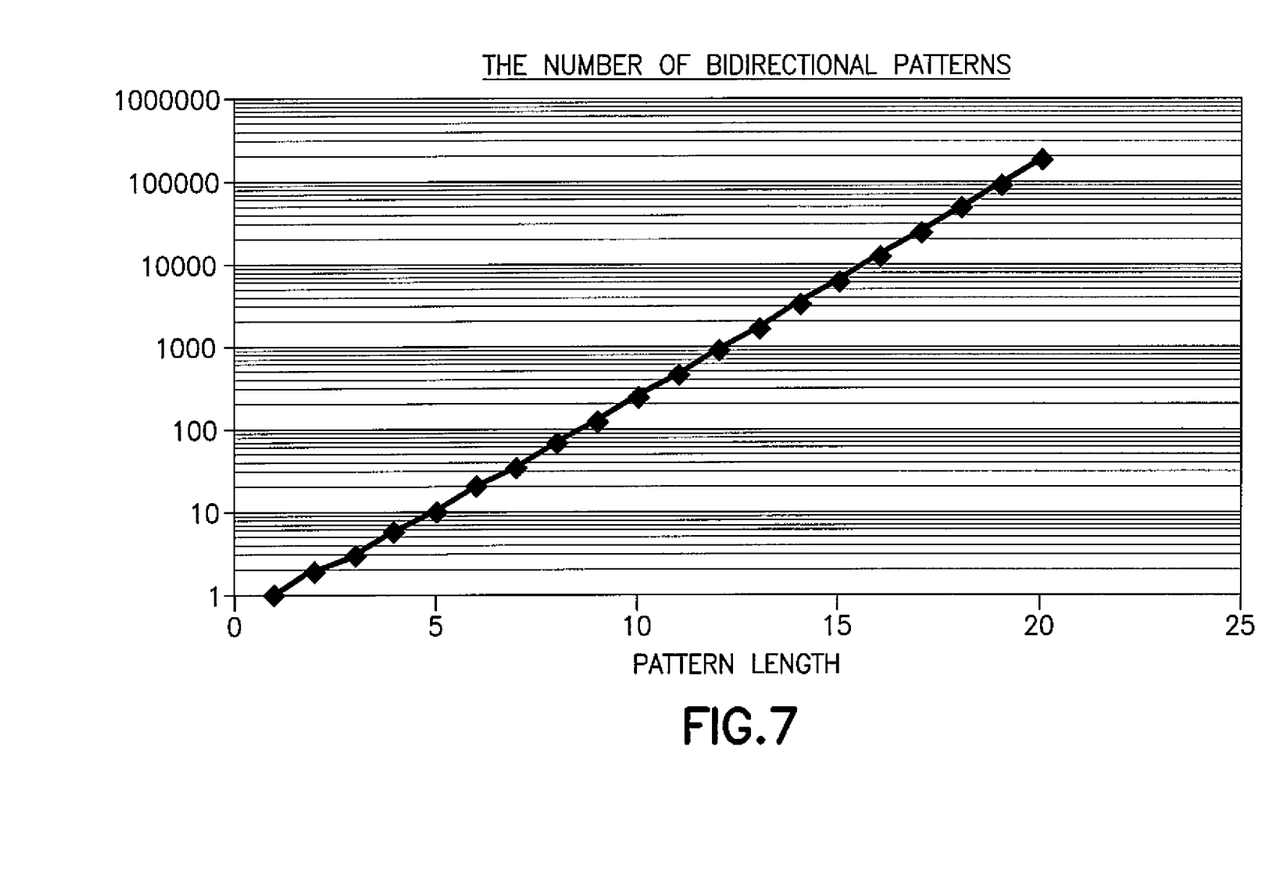
FIG. 7 shows the number of available bi-directional discovery patterns as function of pattern length.

The maximum number of bi-directional discovery patterns that are available corresponding to the largest group of patterns is shown in FIG. 7. This diagram shows that the number of discovery patterns increases exponentially with the pattern length. A dedicated discovery pattern can be provided for each communication node requiring bi-directional communication. A reasonable length of discovery pattern can be provided with support for a reasonably high number of nodes. For example, with pattern length of fifteen Tx/Rx phases, it is possible to support as many as 6435 patterns/nodes.

In the following two exemplifying use cases of discovery patterns are discussed based on the frame structure given in FIG. 4 and patterns given in FIG. 5 (k=2). These give a total of six bi-directional patterns available with N=4.

Figure 8:
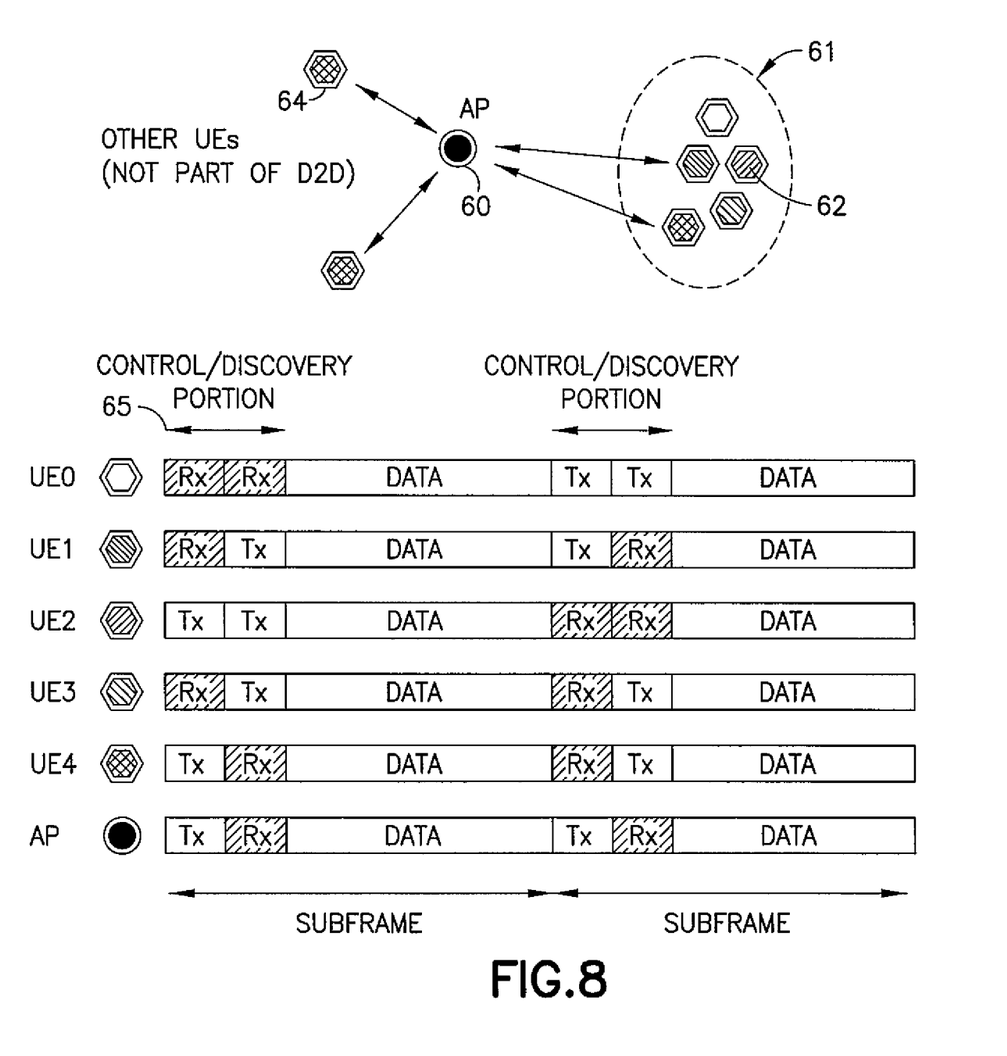
FIGS. 8 and 9 show examples for different discovery scenarios.

An example of the utilization of the proposed discovery scheme to D2D communications utilizing cell-specific control portion is presented in FIG. 8. In this an access point (AP) 60 is a part of the discovery procedure. Up to five UEs 62 can be included in a group 61. Each of the UEs can be provided with a dedicated pattern in the discovery process (N=4). In this example, the exchange of discovery messages is restricted to the control part of the frame, this being denoted by 65 in FIG. 8.

The scheme can be executed by using a procedure where a group of bi-directional patterns is created first. The control portion of each frame is used for the discovery. AP is set to occupy pattern type a (Tx/Rx, see FIG. 4). Using this pattern has no impact for the non-D2D UEs. Any remaining patterns of the group are allocated for different D2D UEs. A dedicated pattern can be allocated for each D2D UE. Discovery UEs are configured to apply a specific discovery format, e.g. with certain periodicity. Otherwise they follow normal control type b. By this procedure, the D2D UEs 62 will be able to have bi-directional communication, while the non-D2D communication by UEs 64 remains unaffected.

Depending on the discovery pattern, certain D2D UEs may not receive DL control signalling from the AP 60 during certain subframes. Also, certain UEs cannot transmit UL control signalling towards AP during certain subframes. These limitations can be taken into account by an appropriate system design. Examples of such designs include support for data scheduling over multiple subframes, as well as hybrid automatic repeat request acknowledgement (HARQ-ACK) bundling over multiple subframes.

Figure 9:
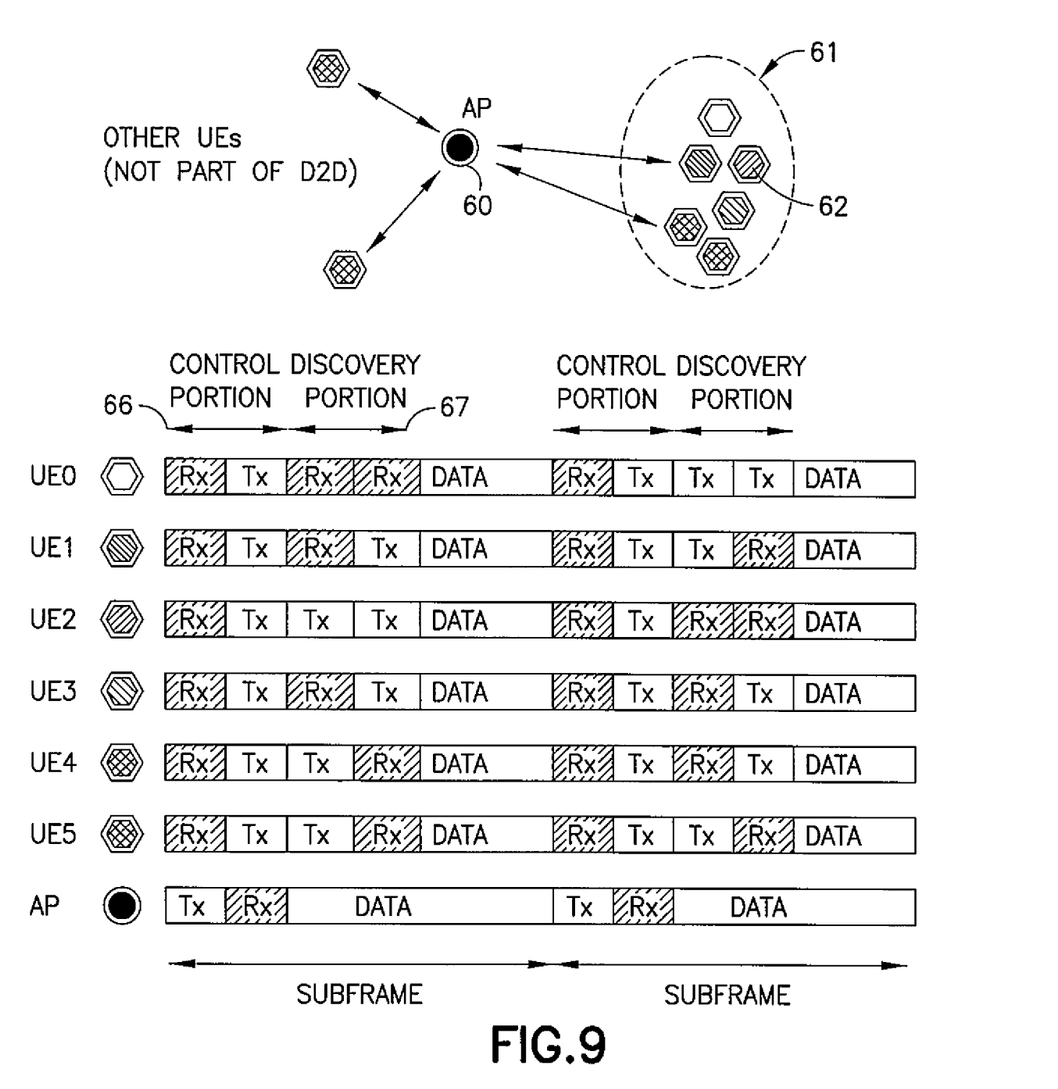

Another example of the utilization of the proposed discovery scheme to D2D communications is shown in FIG. 9. This scheme utilizes dedicated data resources for D2D discovery. In this example the AP 60 is not a part of the discovery procedure, and thus there can be up to six UEs 62 with dedicated pattern in the discovery process (N=4). In this example the discovery is executed based on a procedure where a group of bi-directional patterns is first created and where the control portion 66 of the frames is kept unchanged. Instead, certain data (Tx/Rx) resources are allocated as discovery resources 67 for D2D UEs. The allocation can be provided e.g. with certain periodicity. Dedicated discovery patterns are then allocated for the D2D UEs 62. With the procedure depicted in FIG. 9, the D2D UEs are capable of having bi-directional communications, while all UEs maintain the ability to communicate with the AP.

D2D UEs 62 of FIG. 9 may not be able to transmit/receive UL/DL data to/from AP during discovery periods. This can be taken into account by appropriate system design. Examples of such designs include scheduler restrictions by AP and/or UE and shortening of the data portion.

Figure 10:
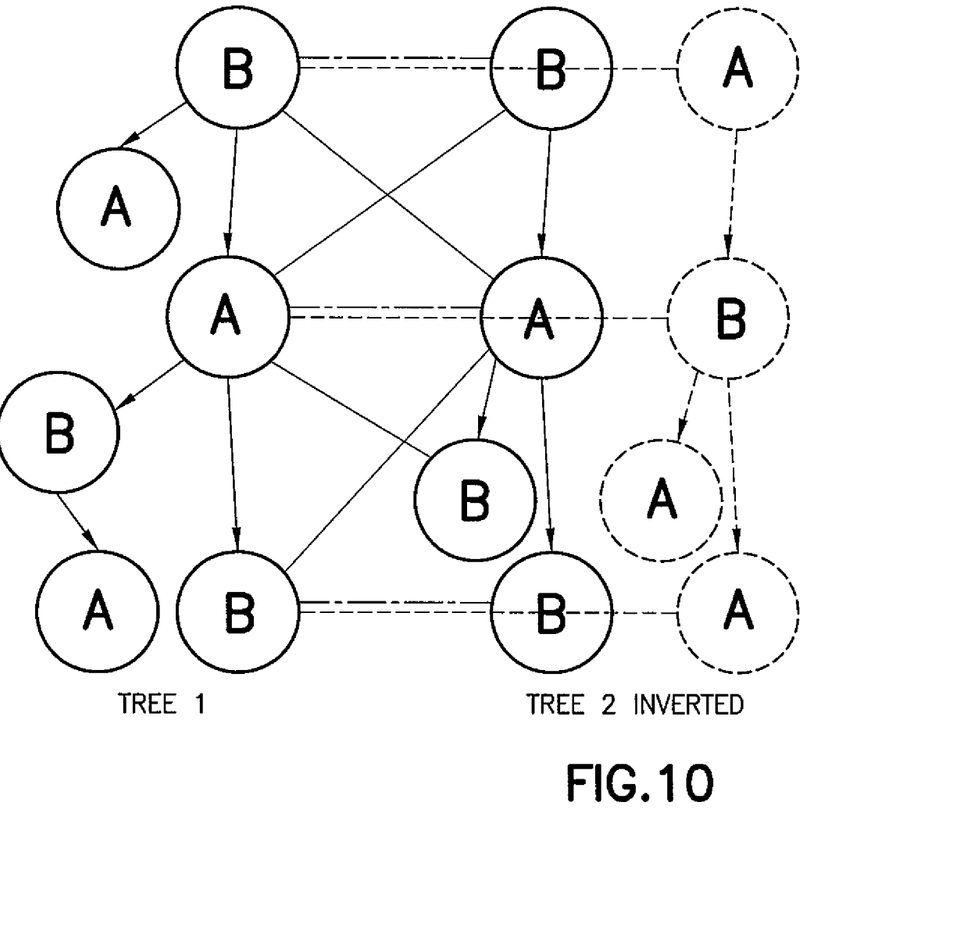
FIG. 10 shows an example of tree inversion.

In the following certain examples for communication between communication trees are considered. For multi-hop communications, all communication links from an AP via relays to the final UE can be displayed as a tree. This is not the case for meshed structures where there can be loops as well. In FIG. 10 two trees are shown, depicted as tree 1 and tree 2. Each tree has different nodes, these being denoted as nodes A and B. Two different patterns in the control structure, i.e. 'TX, RX' and 'RX, TX' are sufficient to allow communication between different neighbouring nodes in each tree. However, communication between the nodes of the different trees may not be possible for all different nodes. That is, although some of the nodes can communicate between the trees, as indicated by solid lines, others cannot, as indicated by dash-dotted lines. It is noted that for clarity all possible lines of communication are not shown.

In order to allow also communication between nodes of the same type (A or B) in different trees, the polarities of one of the trees can be inverted. In other words, the Rx and Tx positions are swapped between the nodes. This is indicated by the dashed version of tree 2 on the right from tree 2. The links that did not work with tree 2 work with the inverted version, as indicated by the dashed lines, because the communications would be between different types (A-B, B-A). Note that the communication between neighbouring nodes within the inverted tree is possible in the same way as it was with the non-inverted tree, i.e. this approach does not degrade the performance of the communication within that tree.

For multiple trees, each tree should invert its polarity with another pattern. If we consider patterns of length N, there are $2^N$ different patters available, corresponding to the binary notations of 0 to N−1.

Within a tree discovery patterns as explained above can be utilized to allow communication between similar nodes. Therefore, if there is a tree with n nodes, n1 labelled with A and n2 labelled with B, n=n1+n2, there is no need for n patterns but only n1 and respectively n2 for the differently labelled nodes. This allows use of shorter discovery patterns. This can be used to have less impact on the "ordinary" communication or more frequent communication possibilities as re-allocation of discovery patterns can be avoided should there be a shortage of patterns.

In accordance with an example patterns using only 'TX, RX' and 'RX, TX' indications as basic patterns can be provided. When only those patterns are used, e.g. to allow bidirectional communication at the same time, it is sufficient if there is one subframe where two nodes use a different order of the 'TX,RX' or 'RX,TX' indications. If the length of the pattern is N (pairs of) positions, then all $2^N$ possible patterns may be used as two patterns will differ on at least one position.

Changing the order of 'TX, RX' indications may inhibit the normal operation of communication with neighbouring nodes in certain situations. In order to mitigate this effect patterns may be changed in a synchronized way for neighbouring nodes. If a node and its neighbouring node(s) swap the order, then communication between those neighbours is still possible. Therefore either the same pattern or patterns with minor differences can be assigned to neighbouring nodes. It is noted that neighbouring nodes can communicate with each other directly regardless of the use of the discovery patterns.

In accordance with a further example only a limited number of disconnects is provided in a tree. This can be provided e.g. by cutting a tree into two sub-trees. The polarity of one of the sub-trees makes it possible to have communication between all nodes of the two sub-trees, either when the sub-tree is inverted or during normal configuration, as shown for inter-tree communication. However, in order to allow each node to communicate with each other node at least once, each connection between these nodes may need to be cut once. Thus, in order not to generate too long cycles it may be preferable to cut more sub-trees simultaneously.

The following example relates to reconfiguration of patterns and/or use of two patterns. In general, two contradicting requirements can be seen on the patterns to be assigned for nodes. A pattern should allow communication of many nodes, which inherently makes the patterns long. At the same time, the pattern should be short in order to allow low delay communication between the nodes. To address these requirements two sets of patterns can be provided. A long pattern allows coordination among a larger number of nodes while a short pattern can be provided for short term coordination between nodes where such coordination allows for obtaining optimization of resource usage. A first pattern can be used to negotiate which nodes should be allowed to communicate based on a short pattern. The short pattern may only allow a subset of the communications of the long patterns. The determination of the best subset for use can depend e.g. on instantaneous device distribution and load status. Therefore this may need to be re-negotiated from time to time. The two patterns can be used in an alternating fashion, or in an interleaved way. The patterns can operate on separate, non-overlapping resources.

The above examples illustrate a framework for enabling communications among half-duplex network nodes (TDD) configured to operate as part of e.g. a Mesh/D2D/self-backhaul network. The above described principles may be applied e.g. In a beyond 4G (B4G) radio system and/or in LTE Release 12 and later versions as a solution for Device-to-Device discovery. A generic framework may be provided for communication arrangement on top of half-duplex TDD nodes configured to a Mesh/D2D/self-backhauling network. The patterns are easy to generate. The design can be very scalable in terms of number of patterns and pattern length. Patterns from different groups can be allocated to different types of nodes fitting their requirements.

The information communicated between devices based on the discovery patterns can be discovery information. However, also other types of information can be communicated based on the patterns. For example, the patterns can be used for distributed synchronization between half-duplex TDD nodes. There can be e.g. some pseudo-random selection of Tx/Rx phases for the synchronization signals according to pre-defined patterns to take care that all nodes would be capable of performing bi-directional sounding for the synchronization signal. It is also noted that term "discovery" is intented to cover pre-determined Tx/Rx phase determination defined for half-duplex Tx nodes not capable of receive and transmit at the same time.

The proposed patterns can be used also elsewhere than proximity-based applications, such as for conveying different control information between network nodes e.g. In order to facilitate distributed interference coordination (where the coordination does not have to be strictly speaking between "cells" only but between any sets of transmitters, be they Access Points, UEs, or Relays), or in order to allow nodes to discover other nodes.

It is noted that whilst embodiments have been described with reference to LTE, similar principles can be applied to any other communication system or indeed to further developments with LTE. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of any of the communication devices may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

In the above various examples of means for implementing the functionalities are given. However, it is noted that these examples do not provide an exhaustive list of means capable of operating in accordance with the inventive principles described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method for controlling discovery of devices in a network of devices, comprising:
assigning, by a network entity, resources for the discovery; and
based on the assigning, providing, by the network entity, accordingly at least two patterns of transmission, Tx, and reception, Rx, phases for the devices in the network for communication of information between the devices, wherein the at least two patterns of transmission, Tx, and reception, Rx, are configured to the devices for the communication of information between the devices,
wherein control of at least one of transmission or reception phases of information is based on grouping of discovery patterns, and
wherein each pattern has a number N of portions for transmission and reception phases and the patterns are grouped based on a number k of portions of the pattern that are allocated for the transmission phases, wherein N and k are integers, and wherein devices associated with a group having a smaller value of k are enabled to receive information from all devices associated with a group having a higher value of k.

2. The method according to claim 1, comprising ruling out at least one out of $$\frac{N!}{k!(N-k)!}$$

bi-directional patterns corresponding to a group with k transmission phases from available patterns, wherein ! indicates a factorial operation defined over non-negative integers.

3. The method according to claim 1, comprising:
providing cell specific discovery control based on a pattern of transmission and reception phases allocated for a device comprising an access point involved in the discovery in accordance with a control type and applying a discovery format and dedicated discovery patterns for other devices involved in the discovery.

4. The method according to claim 1, comprising, when the devices are arranged in at least two different trees, providing different discovery patterns for neighbouring devices by inverting polarity of discovery patterns associated with devices of at least one of the trees.

5. The method according to claim 1, comprising swapping the order of discovery patterns between neighbouring devices.

6. The method according to claim 1, comprising using two sets of discovery patterns in the network, wherein a first set of patterns is for a higher level coordination commands of operation between the devices and a second set of patterns is for implementing parts of the higher level of coordination commands.

7. An apparatus for a device of a network of devices, the apparatus comprising:
at least one processor, and
at least one memory including computer program code, wherein the at least one memory and the computer program code are configured, with the at least one processor, to cause the apparatus to:
at least one of transmit or receive information in accordance with a dedicated pattern of transmission, Tx, and reception, Rx, phases allocated from a predetermined set of at least two different Tx/Rx patterns, wherein the at least two different Tx/Rx patterns comprise information relating to the devices for the communication of information between the devices, wherein the dedicated pattern of transmission Tx and reception Rx phases is configured to use predetermined resources.

8. The apparatus according to claim 7, wherein control of at least one of the transmission or reception phases of information is based on grouping of discovery patterns.

9. The apparatus according to claim 8, wherein patterns in a first group enable bi-directional communication of information between devices associated with the first group and patterns in a second group enable mono-directional communication of discovery information between devices associated with the second group and devices associated with said first group.

10. The apparatus according to claim 8, wherein each pattern has a number N of portions for transmission and reception phases and the patterns are grouped based on a number k of portions of the pattern that are allocated for the transmission phases, wherein N and k are integers, and wherein devices associated with a group having a smaller value of k are enabled to receive information from all devices associated with a group having a higher value of k.

11. The apparatus according to claim 10, wherein the at least one memory and the computer program code are further configured, with the at least one processor to rule out at least one out of $$\frac{N!}{k!(N-k)!}$$

bi-directional patterns corresponding to a group with k transmission phases from available patterns, wherein ! indicates a factorial operation defined over non-negative integers.

12. The apparatus according to claim 8, configured to provide hierarchy between different devices in the network by means of the grouping.

13. A node comprising the apparatus of claim 7.

14. The apparatus according to claim 7, wherein the at least one memory and the computer program code are further configured, with the at least one processor to cause the apparatus to transmit or receive information in accordance with a dedicated discovery pattern of transmission and reception phases allocated from a set of different discovery patterns.

15. A method, comprising:
at least one of transmitting or receiving information in a network in accordance with a dedicated pattern of transmission, Tx, and reception, Rx, phases allocated from a predetermined set of at least two different Tx/Rx patterns, wherein the at least two different Tx/Rx patterns comprise information relating to devices for the communication of information between the devices, wherein the dedicated pattern of transmission Tx and reception Rx phases is configured to use predetermined resources.

16. The method according to claim 15, wherein control of at least one of the transmission or reception phases of information is based on grouping of discovery patterns.

17. The method according to claim 16, wherein patterns in a first group enable bi-directional communication of information between devices associated with the first group and patterns in a second group enable mono-directional communication of discovery information between devices associated with the second group and devices associated with said first group.

18. The method according to claim 16, wherein each pattern has N portions for transmission and reception phases and the patterns are grouped based on a number k of portions of the pattern that are allocated for the transmission phases, and wherein devices associated with a group having a smaller value of k are enabled to receive information from all devices associated with a group having a higher value of k, wherein N and k are integers.

19. The method according to claim 18, wherein at least one memory and computer program code are configured, with at least one processor to rule out at least one out of $$\frac{N!}{k!(N-k)!}$$

bi-directional patterns corresponding to a group with k transmission phases from available patterns, wherein ! indicates a factorial operation defined over non-negative integers.

20. The method according to claim 15, configured to provide hierarchy between different devices in the network by means of the grouping.

21. The method according to claim 15, comprising:
at least one of transmitting or receiving information in accordance with a dedicated discovery pattern of transmission and reception phases allocated from a set of different discovery patterns.

* * * * *